United States Patent [19]
Duve

[11] Patent Number: 5,088,581
[45] Date of Patent: Feb. 18, 1992

[54] ONE-WAY CLUTCH

[75] Inventor: John P. Duve, Brookfield, Ill.

[73] Assignee: Eaton Corporation, Cleveland, Ohio

[21] Appl. No.: 647,947

[22] Filed: Jan. 30, 1991

[51] Int. Cl.⁵ .................... F16D 41/18; F16D 41/00
[52] U.S. Cl. .................... 192/46; 192/107 M; 192/107 T
[58] Field of Search .............. 192/46, 107 T, 107 M, 192/108; 464/41, 37

[56] References Cited

U.S. PATENT DOCUMENTS

| | | | |
|---|---|---|---|
| 366,288 | 7/1887 | Yost et al. | 192/46 X |
| 1,615,534 | 1/1927 | Cassel | 192/46 |
| 3,200,918 | 8/1965 | Horn | 192/46 |
| 3,486,597 | 12/1969 | Carlton | 192/46 |
| 3,589,486 | 6/1971 | Kelch | 192/46 |
| 3,831,401 | 8/1974 | Hurwitz | 192/107 M X |
| 4,155,228 | 5/1979 | Burgener et al. | 192/46 X |
| 4,570,769 | 2/1986 | Isaka | 192/46 |
| 4,657,951 | 4/1987 | Takarada et al. | 192/107 M X |
| 5,000,721 | 3/1991 | Williams | 192/46 X |

FOREIGN PATENT DOCUMENTS

| | | | |
|---|---|---|---|
| 2246447 | 9/1973 | Fed. Rep. of Germany | 192/46 |
| 314892 | 10/1929 | United Kingdom | 192/46 |

Primary Examiner—Rodney H. Bonck
Attorney, Agent, or Firm—R. A. Johnston

[57] ABSTRACT

A one-way ratcheting clutch having a primary annular driving member with a plurality of circumferentially spaced radially inwardly extending lugs and a secondary annular member mounted on a common shaft has a plurality of resilient circumferentially spaced outwardly extending fingers for engaging the lugs configured to be compression loaded. At any relative rotational position at least one, and less than half, of the fingers is in the relaxed or undeflected state to minimize the effects of permanent set where both members are formed of plastic and exposed to service temperatures up to 85° C.

9 Claims, 2 Drawing Sheets

ONE-WAY CLUTCH

BACKGROUND OF THE INVENTION

The present invention relates to one-way clutching or ratcheting mechanisms employed for programmer/timers employed in household washing machines and dishwashers. Programmer/timers for such appliances typically employ an electromechanical programmer which utilizes timed rotation of a cam drum for sequentially operating a plurality of electrical switches for controlling the machine functions during the program interval, which, usually comprises one full rotation of the cam drum.

Electromechanical programmer/timers for appliances commonly employ an oscillating pawl and ratchet indexing mechanism for effecting timed rotation of the switch program cam drum. Alternatively or in combination therewith a continuous gear train drive with overrunning frictional clutch arrangements may be employed to permit continuous rotation of the timing motor and gear train when it is desired to stop rotation of the drum or engage an auxiliary drive mechanism for rotating the cam drum at a different rate, such as by intermittently engaging the pawl and ratchet drive. Examples of such a dual rate appliance programmer/timer cam drum drive are described and claimed in U.S. Pat. No. 4,485,096 and 4,945,196, commonly owned by the assignee of the present application.

Where it is desired to provide a one-way clutch mechanism for transmitting very small torques such as those encountered in programmer/timers for appliances, it has been found desirable to provide a "soft-touch" to the one-way clutch in the reverse or overrunning mode, and to have quiet operation of the clutch when it is overdriven, or the members are relatively rotated in a direction opposite that employed for transmitting power. It is desired to fabricate such one-way clutches from plastic material in order to provide a minimum manufacturing cost in the high volume mass production required for programmer/timer applications for household appliances.

Heretofore, plastic clutching mechanisms for appliance programmer/timers have encountered problems with deterioration of the plastic parts when subjected to exposure, over prolonged periods of time, to the operating temperatures encountered in such appliances, which typically may reach 85 degrees centigrade (85° C.) Thus, it has been desired to provide a one-way clutch mechanism usable in an appliance programmer/timer which may be manufactured readily and inexpensively from molded plastic parts, and which provides a soft touch or feel in the override mode, and yet provides for reliable torque transmission in the drive mode.

SUMMARY OF THE INVENTION

The present invention provides a one-way clutch having relatively soft, quiet ratcheting properties in the reverse or overrunning mode. In the driving mode, power is transmitted from an outer annular ring having internal teeth or lugs to a plurality of circumferentially spaced, resiliently deflectable fingers extending from the outer periphery of an inner annular member which is adapted to engage a device to be driven. The fingers extending from the inner annular member are chosen in number and configuration so that, for any position of the inner member with respect to the outer member for driving, at least one, and preferably more than one, but less than half, of the fingers are in the free undeflected state, with the balance engaged for driving. In the driving mode, the fingers are loaded in columnar compression by engagement with the internal teeth in the outer annular member. The compression loading of the fingers enables the fingers to be formed of a plastic material, and permits service in an environment experiencing temperatures of up to 85°0 C. without yielding of the plastic. The technique of having at least some of the fingers in the undeflected state for any relative rotary position of one annular member with respect to the other ensures that at least some of the teeth will be in the relaxed, free condition, and will not acquire a permanent set. Therefore, after any relative rotation in the reverse or overrunning mode, there are always teeth available in the free, undeflected state to engage the teeth in the outer ring.

The present invention thus provides a unique and novel one-way clutch, which may be fabricated from molded plastic material, and which provides low torque resistance and quiet overrunning in one direction, yet provides for reliable torque transmission in the reverse or driving direction.

DETAILED DESCRIPTION

Figure 1:
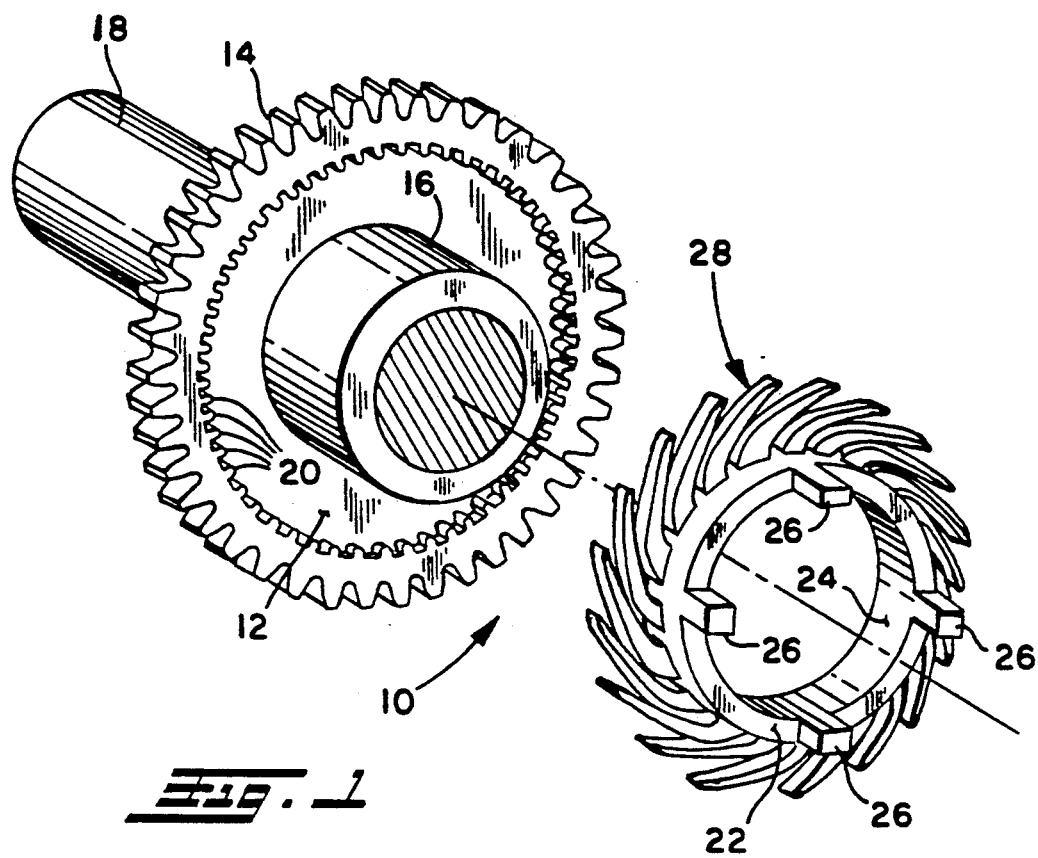
FIG. 1 is an exploded view of the one-way clutch assembly, showing the inner ring removed from the outer ring.

Referring to FIG. 1, the one-way clutch assembly of the present invention is indicated generally at 10, and comprises a primary power receiving member 12 having a plurality of gear teeth 14 provided about the outer periphery thereof, with a central hub 16 journalled on a shaft 18. The member 12 has a plurality of radially inwardly extending teeth or lugs 20 configured as shown in FIGS. 1 and with substantially parallel sides provided about the circumference intermediate the hub and the outer teeth 14. In the presently preferred practice, the outer teeth 14 are adapted to receive power from a suitable driving source such as, for example, a motorized gear drive (not shown). It will be understood, however, that alternatively the teeth 14 could be ratchet teeth, and driven by an oscillating drive pawl (not shown) in a manner well known.

A secondary annularly configured drive member 22 has the inner periphery 24 thereof sized and configured for free rotation or journalling on the hub 16. The secondary member 22 has a plurality of driving lugs 26 disposed about the circumference and extending axially therefrom, and which are adapted for driving engagement with a suitable device to be driven (not shown). It will be understood that, alternatively, the secondary member 22 may be the power receiving member and the primary member may be the power transmitting member.

Figure 2:
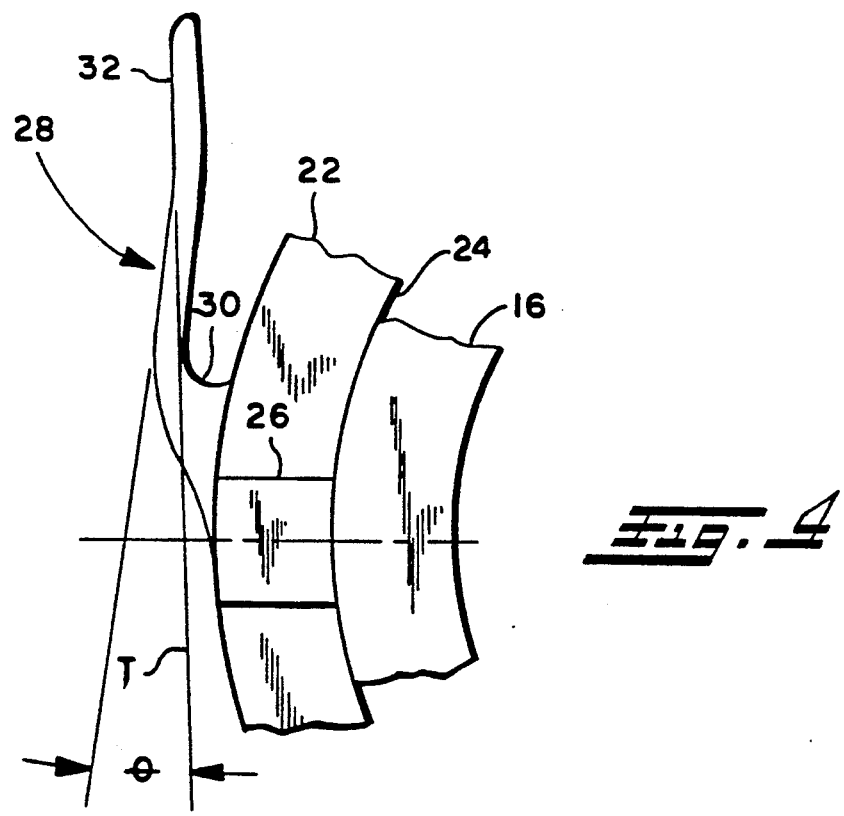
FIG. 2 is a side view of the assembly of FIG. 1, with the inner ring assembled to the outer ring.
Figure 2:
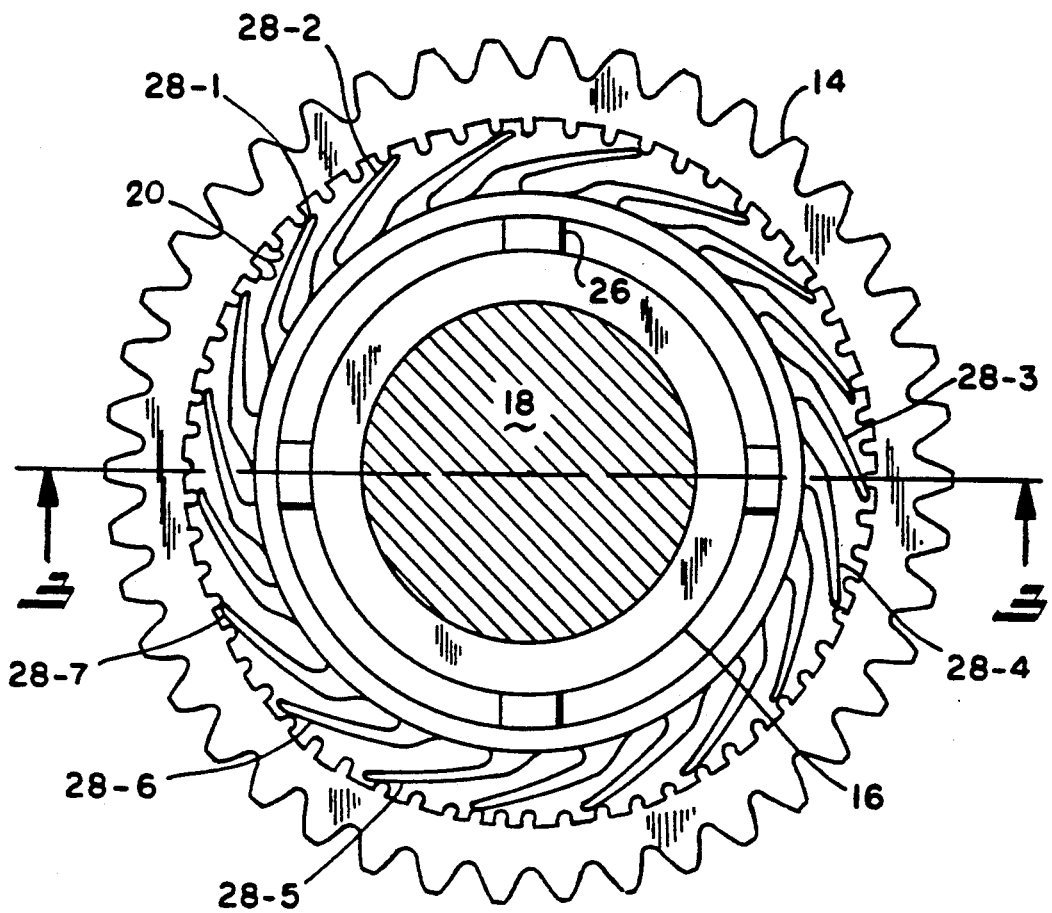
Figure 3:
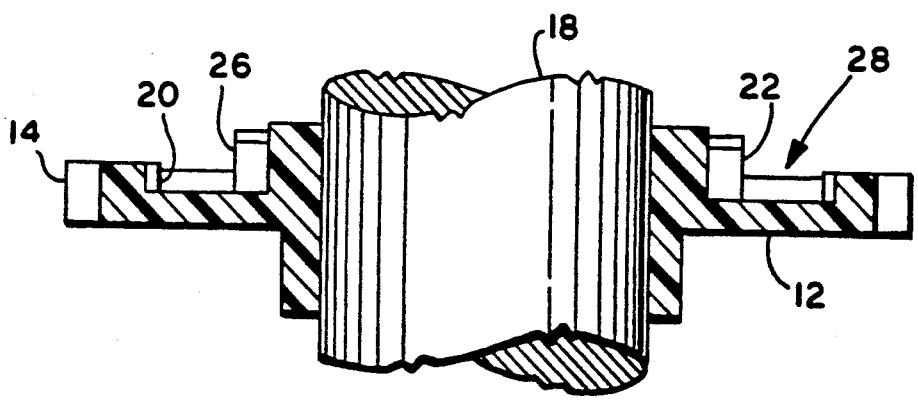
FIG. 3 is a section view of the assembled clutch, taken along section indicating lines 3—3 of FIG. 2; and, FIG. 4 is an enlarged detailed view of the preferred configuration of the fingers on the inner ring.

Referring to FIGS. 1, 2, and 3, the annular member 22 has a plurality of circumferentially spaced resiliently deflectable fingers, indicated generally at 28, disposed about the outer periphery thereof, and extending outwardly therefrom inclined to the radius of the member 22.

Referring to FIG. 4, one of the fingers 28 is shown enlarged in the preferred practice as having a circumferentially thickened base portion 30, and a substantially thinner radially outer or free end portion 32, which is inclined at an angle θ slightly radially inwardly with respect to a tangent line T drawn perpendicular to the radius of the annular member 22. In the present practice, the inclination angle θ is less than ninety degrees (90°) and preferably about negative 5 degrees. The fingers have a generally straight configuration as shown in FIGS. 2 and 4; and, will be noted that the very tip portion of the free end 32 of the fingers 28 is formed generally parallel to the tangent line T. In the presently preferred practice, the free end portion 32 of each of the fingers 28 has a length of at least three and preferably about ten times the thickness of the free end portion to provide the desired deflection properties or spring rate in cantilever when formed of a suitable plastic material. In the presently preferred practice, the primary member 12 and the secondary annular member 22 are each formed of material selected from the group consisting essentially of: (i) a combination of acetal resin plastic material and polyimide plastic material (ii) polyimide or (iii) acetal plastic material; however, it will be understood that other materials may be employed to provide the desired modulus of elasticity or compression. The combination of acetal and polyimide materials presently employed have been found to be satisfactory for extending service life when exposed to an environment of temperatures of up to 85° C.

Referring to FIGS. 2 and 3, the annular ring 22 is shown as assembled onto the primary member 12, with the fingers 28 engaging the lugs 20 respectively, in accordance with their relative rotational position. In particular, for the embodiment illustrated, the member 22 preferably has 19 of the flexible fingers received within a plurality of 60 of the lugs 20 provided about the primary member 12. In the presently preferred practice, for a given even integer number of the plurality of the fingers 28 or plurality of lugs 20, the other plurality has an odd integer number.

Referring now to FIG. 4, 8 of the 19 fingers 28, those indicated by reference numerals 28-1 through 28-8 are in the free, or undeflected, state, with the remaining fingers 28 deflected in varying amounts radially inwardly by contact with one of the lugs 20. It will be understood that at least one of the fingers 28 and preferably more than one, but less than half, of the fingers 28 must be in the undeflected, or free, state for any given rotational position of the member 22 with respect to the primary member 12. This arrangement minimizes the chance that a permanent set will occur in all of the finger 28, so that upon rotation of the primary member 12 in a counterclockwise or driving direction in FIG. 2, torque transmission is assured by engagement of the free state, or undeflected, fingers 28-1 through 28-7 with lugs 20, in the event that the remaining fingers have taken a permanent set due to deflection by the lugs 20.

Although the invention has hereinabove been described with respect to the preferred embodiment employing 19 fingers on the secondary annular member, and 60 lugs 20 on the primary member 12, it will be understood that, for differing torque requirements, the number and configuration of the fingers and lugs may be varied. Furthermore, although the preferred configuration for the fingers 28 is illustrated in FIG. 4, it will be understood that the configuration of the fingers may be modified or varied. Any such variations will, however, take into consideration the feature of the invention that the strength of the fingers in a torque-transmitting direction will be maximized by configuring the fingers to take the torque loading in direct compression, as does the finger configuration shown in FIG. 4.

Also, it will be understood that the design and configuration of the fingers will be such as to minimize the force required for beam deflection thereof to thereby minimize the stiffness of the ratcheting action in the overrunning mode.

The present invention thus provides a unique one-way clutch having a fine degree of resolution in the overrunning or ratcheting mode, and providing for positive engagement and torque transmission in the driving mode. The one-way clutch of the present invention may be easily and inexpensively formed of injection-molded plastic parts. This clutch employs cantilevered fingers which in the driving mode are loaded primarily in columnar compression.

Although the present invention has been described herein with respect to the illustrated embodiments, it will be understood that the invention is capable of modification and variation, and is limited only by the following claims.

I claim:

1. A one-way ratcheting clutch comprising:
   (a) a primary annular driving member having a first plurality of rigid teeth disposed circumferentially thereabout and extending radially inwardly with substantially parallel sides, said outer annular member having other driving surfaces thereon for power transmission therewith;
   (b) an inner annular member disposed concentrically with said outer member and a second plurality of less than one-half of said first plurality of resilient fingers relatively thin with respect to the length thereof with a generally straight configuration disposed circumferentially thereabout and extending in a generally outward direction and inclined substantially to the radial direction, with the free ends thereof engaging said plurality of rigid teeth, wherein one of said plurality of rigid teeth and resilient fingers has an even integer number and the other has an odd integer number, wherein, at any rotational position of said outer member with respect to said inner member, at least one, and less than one half, of said fingers are in a free, substantially undeflected state and the remainder thereof are resiliently deflected by contact with said first plurality of teeth, thereby effecting one-way generally fine-resolution and relatively soft feel ratcheting action upon said relative rotation in one direction and torque transmission in the opposite direction.

2. The one-way clutch defined in claim 1, wherein said outer member power transmission surfaces comprise a plurality of radially outwardly extending gear teeth.

3. The one-way clutch defined in claim 1, wherein said inner and outer members are formed of plastic material.

4. The one-way clutch defined in claim 1, wherein said first plurality comprises 60 rigid teeth and said second plurality comprises 19 fingers.

5. The one-way clutch defined in claim 1, wherein each of said generally straight fingers is inclined to the radial direction at an angle greater than π/4 radians.

6. The one-way clutch defined in claim 1, wherein said inner annular member is formed of material consisting of a combination of acetal and polyimide plastic.

7. The one-way clutch defined in claim 1, wherein said inner and outer annular members are formed of plastic material capable of service at temperatures up to 85° C.

8. The one-way clutch defined in claim 1, wherein said fingers each have a base portion and a free end portion having the length thereof at least three (3) times the transverse thickness thereof.

9. A one-way clutch comprising:
 (a) an outer annular member having a first plurality of rigid teeth disposed thereabout and extending radially inwardly with each of said teeth having substantially parallel sides, said outer annular member having other driving surfaces thereon for power transmission therewith;
 (b) an inner annular member disposed concentrically with said outer member and having a second plurality of resilient fingers relatively thin with respect to its length thereof and having a generally straight configuration disposed circumferentially thereabout and extending in a generally outward direction, said fingers arranged inclined for driving engagement with said rigid teeth in only one direction of rotation such that said fingers are substantially in columnar compression when driving and provide a relatively soft feel in the override mode when rotated in the opposite direction.

* * * * *